(12) United States Patent
Sugishita

(10) Patent No.: US 7,349,109 B2
(45) Date of Patent: Mar. 25, 2008

(54) IMAGING APPARATUS AND PRINT CONTROL METHOD FOR AN IMAGING APPARATUS

(75) Inventor: Satoru Sugishita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 795 days.

(21) Appl. No.: 10/251,833

(22) Filed: Sep. 23, 2002

(65) Prior Publication Data

US 2003/0067629 A1 Apr. 10, 2003

(30) Foreign Application Priority Data

| Sep. 21, 2001 | (JP) | ............................. 2001-289545 |
| Nov. 29, 2001 | (JP) | ............................. 2001-364630 |
| Sep. 9, 2002 | (JP) | ............................. 2002-262339 |

(51) Int. Cl.
*G06F 15/00* (2006.01)
*G03F 3/08* (2006.01)

(52) U.S. Cl. .................................... 358/1.13; 358/1.14

(58) Field of Classification Search ............... 358/1.13, 358/1.14, 1.15, 1.9; 399/82; 710/6, 63; 271/288; 700/2, 4, 9
See application file for complete search history.

(56) References Cited

U.S. PATENT DOCUMENTS

| 4,674,866 | A | * | 6/1987 | Tanaka ......................... 355/23 |
| 5,299,296 | A | | 3/1994 | Padalino et al. ............ 358/1.13 |
| 5,557,390 | A | | 9/1996 | Ito et al. ........................ 399/85 |
| 5,774,356 | A | * | 6/1998 | Hisatake et al. ............... 700/28 |
| 5,812,907 | A | * | 9/1998 | Itoh et al. ...................... 399/87 |
| 6,185,406 | B1 | * | 2/2001 | Ueda ........................... 399/402 |
| 6,347,203 | B1 | * | 2/2002 | Kutsuwada ................... 399/82 |
| 6,587,735 | B1 | * | 7/2003 | Yaguchi ......................... 700/2 |
| 2001/0028465 | A1 | * | 10/2001 | Sugino ......................... 358/1.9 |
| 2003/0067629 | A1 | | 4/2003 | Sugishita | |

FOREIGN PATENT DOCUMENTS

| EP | 0 630 145 | 12/1994 |
| JP | 7-107230 | 4/1995 |
| JP | 9-30741 | 2/1997 |
| JP | 10-42080 | 2/1998 |
| JP | 11-245460 | 9/1999 |
| JP | 2000-15897 | 1/2000 |
| JP | 2000-92257 | 3/2000 |
| JP | 2000-233550 | 8/2000 |

(Continued)

OTHER PUBLICATIONS

U.S. Appl. No. 10/251,833, filed Sep. 23, 2002, Sugishita.

(Continued)

*Primary Examiner*—Gabriel Garcia
(74) *Attorney, Agent, or Firm*—Oblon, Spivak, McClelland, Maier & Neustadt, P.C.

(57) ABSTRACT

An imaging apparatus comprises a plurality of different types of imaging means, each associated with one of a plurality of different types of imaging applications, each imaging application producing a print job containing image data; an engine configured to cause the image data to be reproduced on a recording medium; and an image data regulation manager used in common among the different types of applications and configured to interface the image data from said different types of applications between the engine and said different types of applications.

29 Claims, 15 Drawing Sheets

FOREIGN PATENT DOCUMENTS

JP          2001-156969        6/2001

OTHER PUBLICATIONS

U.S. Appl. No. 10/646,819, filed Aug. 25, 2003, Sugishita et al.
U.S. Appl. No. 10/713,195, filed Nov. 17, 2003, Sugishita et al.
U.S. Appl. No. 11/137,759, filed May 26, 2005, Sugishita et al.
U.S. Appl. No. 10/601,672, filed Jun. 24, 2003, Sugishita et al.
U.S. Appl. No. 11/500,955, Aug. 9, 2006, Sugishita.
U.S. Appl. No. 11/828,051, filed Jul. 25, 2007, Sugishita.

* cited by examiner

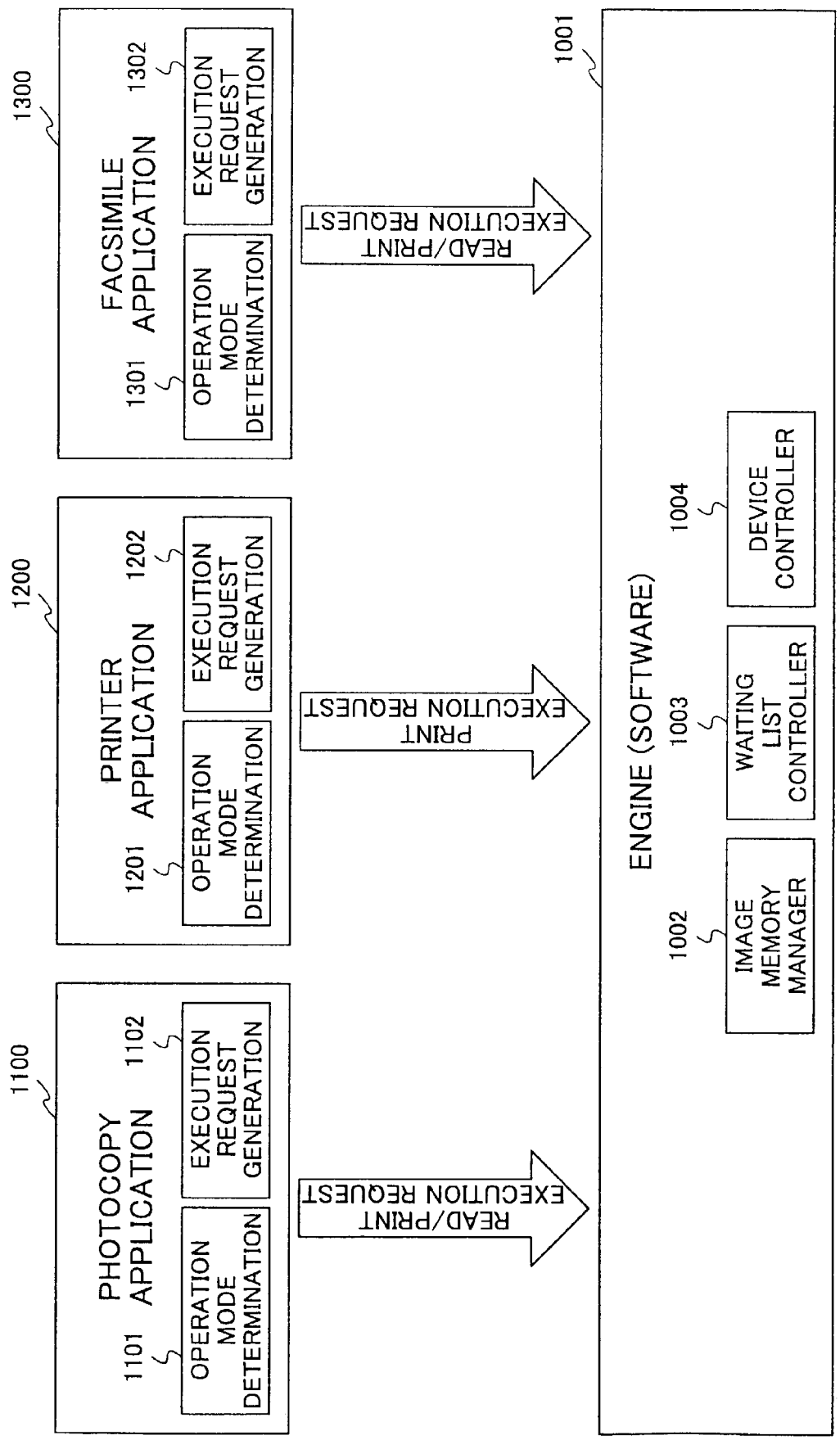

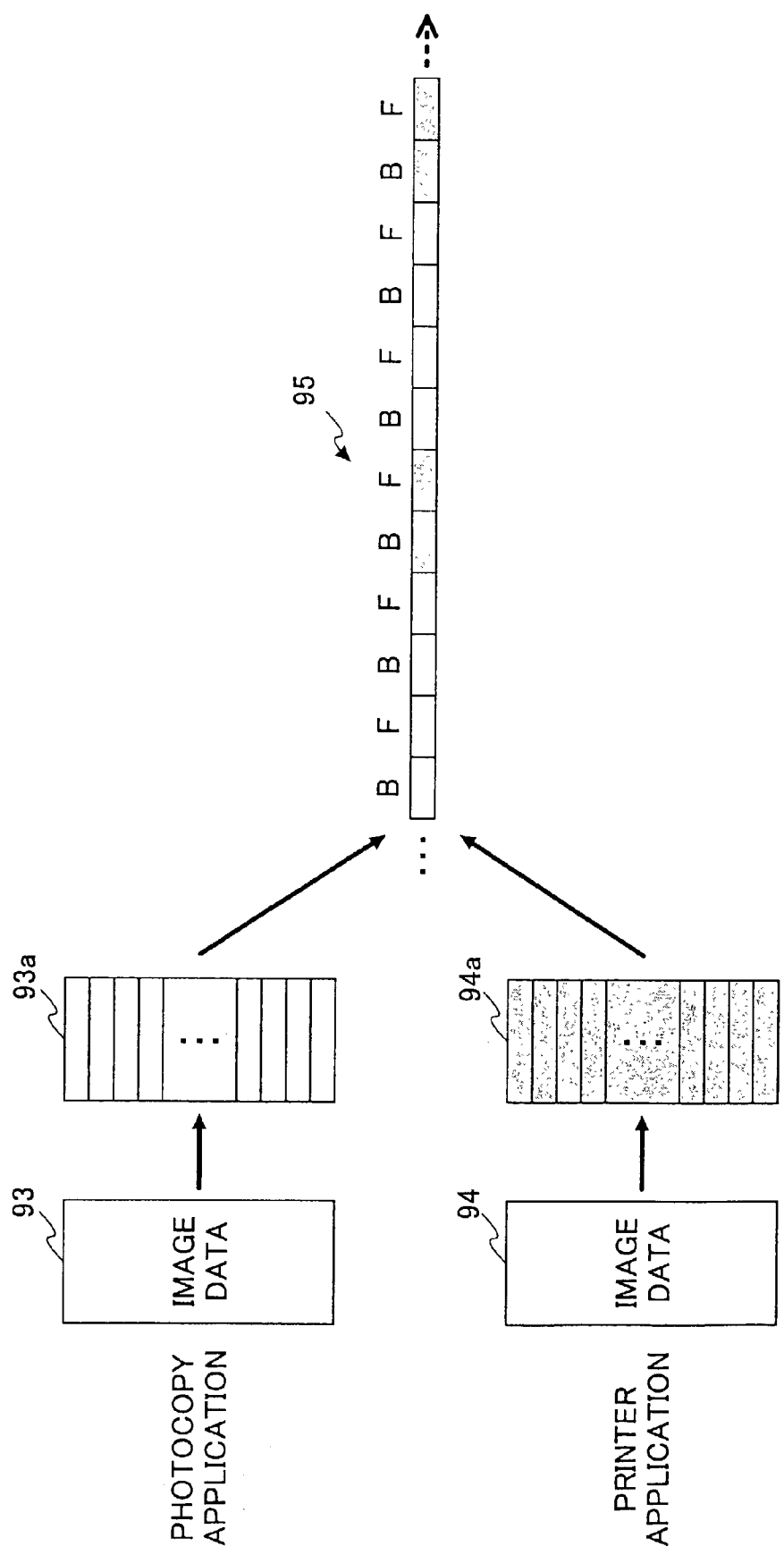

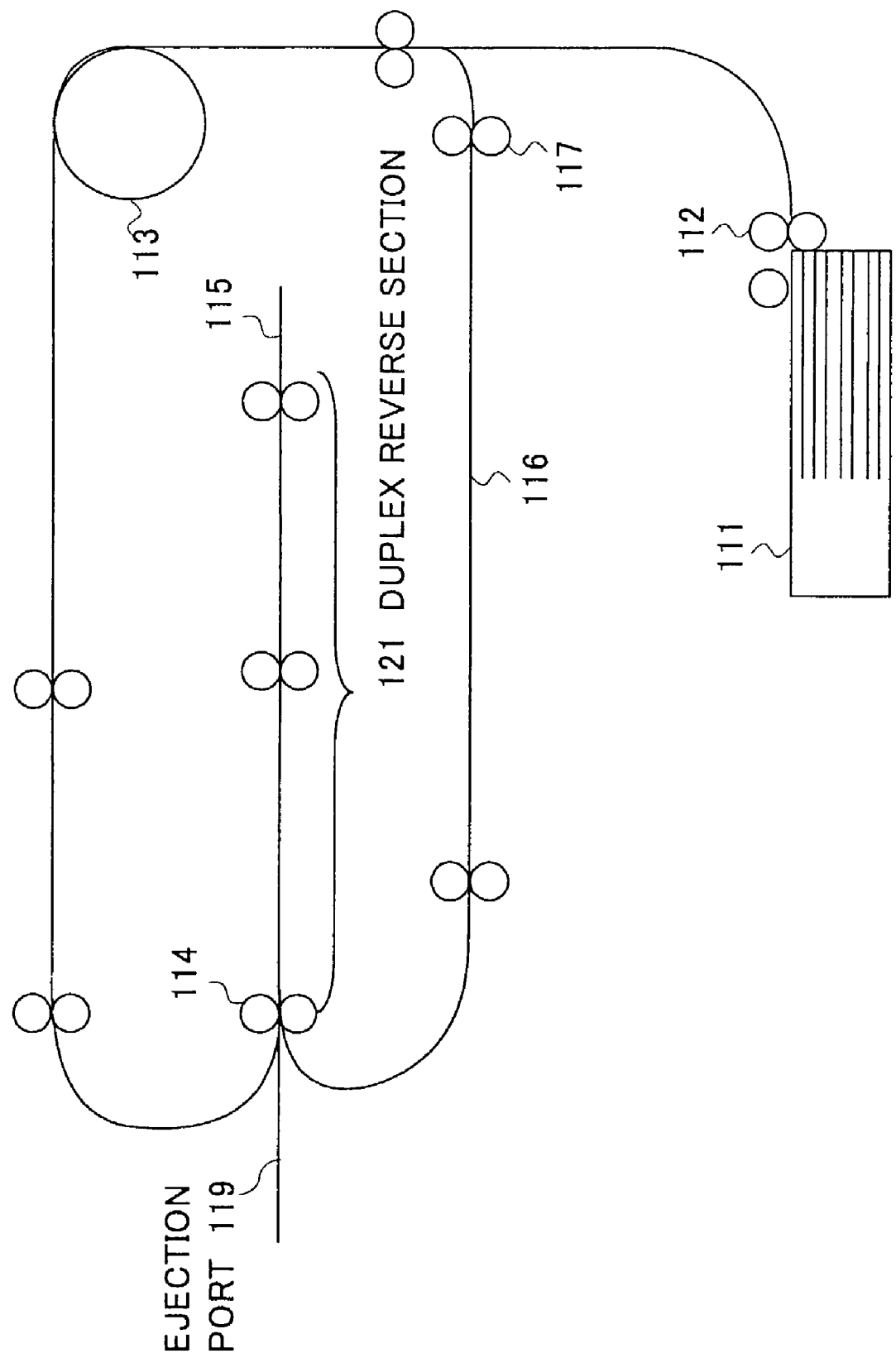

FIG.14A

| PRIORITY | JOB NAME | MODE |
|---|---|---|
| 1 | JOB A (UNDER EXECUTION) | DUPLEX |
| 2 | JOB B | DUPLEX |
| 3 | JOB C | DUPLEX |
| 4 | JOB D | SIMPLEX |
| 5 | JOB E | DUPLEX |
| 6 | JOB F | SIMPLEX |
| 7 | JOB G | SIMPLEX |
| 8 | JOB H | DUPLEX |

FIG.14B

| PRIORITY | JOB NAME | MODE |
|---|---|---|
| 1 | JOB D (UNDER EXECUTION) | SIMPLEX |
| 2 | JOB A (SUSPENDED) | DUPLEX |
| 3 | JOB B | DUPLEX |
| 4 | JOB C | DUPLEX |
| 5 | JOB E | DUPLEX |
| 6 | JOB F | SIMPLEX |
| 7 | JOB G | SIMPLEX |
| 8 | JOB H | DUPLEX |

FIG.14C

| PRIORITY | JOB NAME | MODE |
|---|---|---|
| 1 | JOB F (UNDER EXECUTION) | SIMPLEX |
| 2 | JOB A (SUSPENDED) | DUPLEX |
| 3 | JOB B | DUPLEX |
| 4 | JOB C | DUPLEX |
| 5 | JOB E | DUPLEX |
| 6 | JOB G | SIMPLEX |
| 7 | JOB H | DUPLEX |

FIG.14D

| PRIORITY | JOB NAME | MODE |
|---|---|---|
| 1 | JOB A (UNDER EXECUTION) | DUPLEX |
| 2 | JOB B | DUPLEX |
| 3 | JOB C | DUPLEX |
| 4 | JOB D | SIMPLEX |
| 5 | JOB E | DUPLEX |
| 6 | JOB F | SIMPLEX |
| 7 | JOB G | SIMPLEX |
| 8 | JOB H | DUPLEX |

IMAGING APPARATUS AND PRINT CONTROL METHOD FOR AN IMAGING APPARATUS

BACKGROUND OF THE INVENTION

1. Field of the Invention

The present invention generally relates to a hybrid imaging apparatus integrating functions of multiple types of imaging apparatuses, such as a photo-copier, a printer, a facsimile machine, and other imaging devices, and to a print control method for such a hybrid imaging apparatus.

2. Description of the Related Art

In recent years, a so-called multi-function peripheral, in which various types of imaging functions (e.g., printing, photocopying, facsimile, etc.) are provided in a single apparatus, has been known. Such a multi-function imaging apparatus is also referred to as a hybrid imaging apparatus. In a hybrid imaging apparatus, a display, a printing unit, an optical scanner, an image-forming unit, and other units (collectively referred to as "multi-function peripherals") are accommodated in one housing. In addition, various different applications, such as a printer application, a photocopy application, and a facsimile application, are installed in the apparatus corresponding to the respective functions. By switching among these applications, the hybrid imaging apparatus can accomplish multiple jobs requested by the multi-function peripherals.

In the conventional hybrid imaging apparatus, the applications operate independently without a unified rule. Each application produces an execution request independently, and supplies the request directly to the engine, as illustrated in FIG. 1. For example, photocopy application 1100 determines the operation mode, such as a duplex copy mode or a simplex copy mode, and generates an execution request based on the determined mode. The execution request causes the associated hardware resources, via the engine 1001, to execute the request. The same applies to the printer application 1200 and the facsimile application 1300.

The engine 1001 is realized by, for example, firmware, including image memory manager 1002 for managing image information, waiting list controller 1003 for controlling the order of executing the requests, and device controller 1004 for controlling the associated device.

The conventional hybrid imaging apparatus with independently operating multiple applications has a problem when carrying out duplex print jobs from different applications. In general, an interleave technique is employed when carrying out two different duplex jobs from the same application for the purpose of improving the productivity. However, it is difficult for the conventional hybrid imaging apparatus to apply the interleave technique to duplex jobs from different applications. This will be explained with reference to FIGS. 2A through FIG. 2C.

If an ordinary interleave technique is applied to treating multiple duplex jobs from different applications, image data supplied from different peripherals (a photocopier and a printer in the example shown in FIG. 2A) should be processed as illustrated in FIG. 2A, in order to achieve a high productivity. Namely, image 2 from a printer is interleaved between image 1 and image 3, which are supplied from a photocopier. Similarly, image 5 from the printer is interleaved between image 4 and image 6, which are supplied from the photocopier.

In other words, images 1, 3, 4, and 6 are included in a print job requested by the photocopy application 1100 to the engine 1001, while images 2 and 5 are included in a print job requested by the printer application 1200 to the engine 1001. Images 1 and 3 are reproduced on both sides (i.e., the front and the back) of a sheet, respectively. Similarly, images 4 and 6 for page 2 of photocopy are reproduced on both sides of a different sheet. Images 2 and 5 from the printer are printed out on both sides of another sheet.

However, when the engine 1001 of the conventional hybrid imaging apparatus actually carries out the above-described interleaving, productivity is often lowered because it is not known when the execution requests will be issued from independently operating applications.

As illustrated in FIG. 2B, if simply applying the interleave technique to the conventional hybrid imaging apparatus, the engine 1001 first reproduces image 1 from the photocopy application 1100 on the front side of a sheet, then executes image 2 from the printer application 1200 on the front side of the next sheet. These two sheets remain in the apparatus, without being ejected, until the counterpart images 3 and 5 are reproduced on the back sides. Then, the engine 1001 reproduces image 3 from the photocopy application 1100, which is the counterpart of image 1, on the back side of the first sheet, and this sheet is ejected.

Next, the engine 1001 executes a print request for the second page of photocopy to reproduce image 4 on the front side of the third sheet. At this point in time, the second sheet and the third sheet, each of which bears an image only on the front side, are accumulated inside the imaging apparatus in this order. Accordingly, image 6 cannot be reproduced on the back of the third sheet until image 5 is reproduced on the back of the second sheet and until the second sheet is ejected. If the print request for image 5 produced by the printer application 1200 is delayed for some reason, the subsequent process stops. In this case, even if the print request for image 6 from photocopy application 1100 has reached the engine 1001, image 6 cannot be reproduced because of the existence of the second sheet on which back-side an image has not yet been reproduced. Consequently, undesirable time loss occurs, as illustrated in FIG. 2B, and the productivity is inevitably lowered. Furthermore, the third sheet may hit the trailing edge of the second sheet, and cause a paper jam, depending on the type of the apparatus. Thus, the conventional hybrid imaging apparatus can not advantageously make use of the interleave technique for duplex print operations.

Instead, to avoid the above-described problem, the conventional hybrid imaging apparatus treats the print jobs independently when duplex print jobs are produced by different applications, as illustrated in FIG. 2C. The entire print job for photocopy (that is, images 1 through 4 in this example) is executed first, reproducing images on the front and the back of sheet alternately. During the execution of this print job, another duplex print job from the printer application 1200 is waiting. When the entirety of the photocopy job is finished, the print job with image data 5 and 6 produced by the printer application 1200 is then executed. With this method, the printing rate is reduced, and the multiple functions furnished in the hybrid imaging apparatus cannot be efficiently used. In fact, no attempt has been made so far to apply the interleave technique to the hybrid imaging apparatus to mix duplex jobs from different applications.

Meanwhile, Japanese patent laid-open publication No. 2000-0158972 discloses a technique in which if it is predictable that a first output job is to be interrupted, another job that is not likely to be interrupted is processed prior to the first output job. However, this technique is not addressed to a hybrid imaging apparatus involving different types of imaging applications. It is difficult for this technique to predict a possibility of interruption in duplex printing operations where print jobs from different imaging applications are mixed.

Japanese patent laid-open publication Nos. 2000-092257 and 2000-233550 disclose a technique for allowing the user to change priority of the reserved print jobs. These publications do not address a hybrid imaging apparatus. In addition, it is difficult for the user to determine how the priority is changed before interruption occurs. Changing the priority after the interruption does not solve the problem of falling of productivity in duplex printing operations at all.

SUMMARY OF THE INVENTION

Therefore, it is an object of the present invention to provide a hybrid imaging apparatus that is capable of processing print jobs generated by multiple different types of applications at high productivity, while effectively making use of an interleave technique.

It is another object of the invention to provide a print control method for allowing an imaging apparatus to efficiently process multiple print jobs, while maintaining the productivity high.

To achieve the object, in one aspect of the invention, an imaging apparatus comprises a plurality of different types of imaging means, each associated with one of a plurality of different types of imaging applications, each imaging application producing a print job containing image data; an engine configured to cause the image data to be reproduced on a recording medium; and an image data regulation manager used in common among the different types of applications and configured to interface the image data from said different types of applications between the engine and said different types of applications.

With this arrangement, by inserting the image data regulation manager between the applications and the engine, the engine can treat various print jobs smoothly even if print jobs from different types of imaging applications are mixed.

The image data regulation manager organizes the image data contained in each print job into subdivisions, and transmits the subdivisions to the engine.

For example, when receiving first image data of a first print job and second image data of a second print job, the image data regulation manager coordinates and mixes the subdivisions of the first and second image data, and transmits a mixed set of subdivisions to the engine.

In this manner, the imaging apparatus can executes multiple print jobs efficiently, by interleaving image data of different print jobs. Consequently, the productivity can be maintained high.

In another aspect of the invention, a print control method for controlling multiple print jobs for reproducing multiple image data in an imaging apparatus is provided. This method comprises the steps of:
(a) determining if there is a possibility that reproduction of one of said multiple image data will be suspended during a printing operation; and
(b) if there is the possibility of said suspension, withholding a recording medium from being supplied into the imaging apparatus until the possibility of said suspension is eliminated.

In still another aspect of the invention, a print control method for controlling multiple print jobs for reproducing multiple image data in an imaging apparatus comprises the steps of:

(a) determining if there is a possibility that reproduction of one of said multiple image data will be suspended during a printing operation; and
(b) if there is the possibility of said suspension, causing another image data of a simplex print job to be executed, while suspending execution of said one of multiple image data.

In yet another aspect of the invention, a print control method for controlling multiple print jobs for reproducing multiple image data in an imaging apparatus comprises the steps of:
(a) determining if there is a possibility that reproduction of one of said multiple image data will be suspended during a printing operation; and
(b) if there is not the possibility of said suspension, then reproducing at least a portion of another image data before all of said one of multiple image data is reproduced.

With either method, reproduction of image data of various print jobs is controlled so as to avoid a situation in which the entire printing operation is stopped in the printing apparatus. Multiple print jobs are accomplished in flexible and efficient manner, and consequently, productivity is maintained high.

BRIEF DESCRIPTION OF THE DRAWINGS

Other objects, features, and advantages of the invention will become more apparent from the following detailed description when read in conjunction with the accompanying drawings, in which:

FIG. 1 illustrates the relation between applications and the engine in the conventional hybrid imaging apparatus;

FIG. 8 illustrates how the common platform processes the image data designated by different applications;

FIGS. 10A and 10B illustrate examples of reverse sections used for duplex printing;

FIGS. 14A through 14D illustrate examples of priority of various jobs.

DESCRIPTION OF THE EMBODIMENTS

The preferred embodiment of the invention will now be described with reference to the attached drawings.

Figure 3:
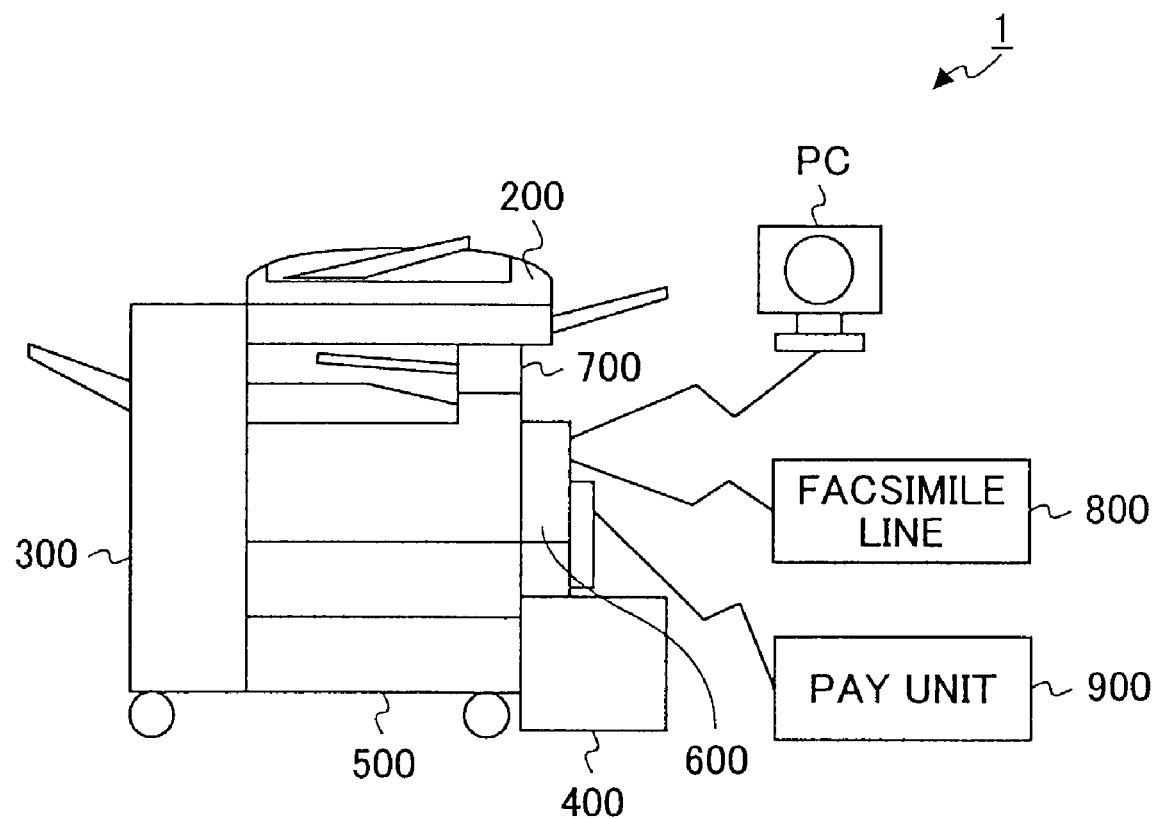
FIG. 3 schematically illustrates a hybrid imaging apparatus according to the invention.

FIG. 3 schematically illustrates the hybrid imaging apparatus 1 according to an embodiment of the invention. The hybrid imaging apparatus 1 comprises an automatic document feeder (ADF) 200, a finisher 300 with a stapler and a shift tray, a reverse ejection unit 400, an extended paper-feed tray 500, a large capacity tray (LCT) 600, and a one-bin tray 700. Although not shown in FIG. 3, the hybrid imaging apparatus 1 has multiple different types of imaging means, such as a scanner means, a photocopy means, facsimile means, a printer means, etc. Accordingly, the hybrid imaging means 1 is capable of reproducing various types of image data optically scanned using the photocopy means, transmitted from the personal computer PC, or received from the facsimile line 800. A pay unit 900 is connected to the hybrid imaging apparatus 1. The hybrid imaging apparatus 1 limits the number of prints based on the signal from the pay unit 900.

Figure 4:
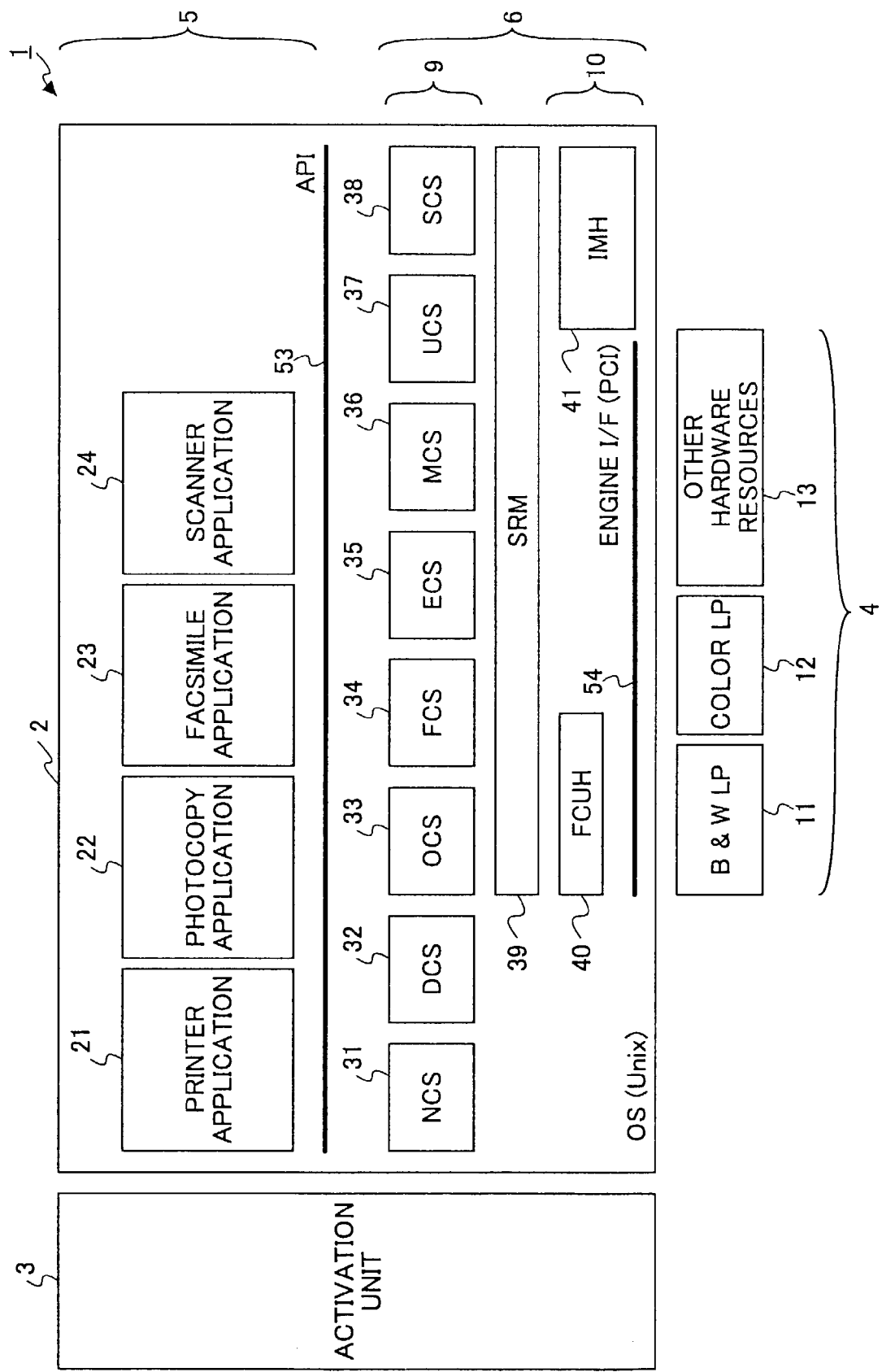
FIG. 4 illustrates the layer structure of the hybrid imaging apparatus according to an embodiment of the invention.

FIG. 4 illustrates the layer structure of the hybrid imaging apparatus 1. The hybrid imaging apparatus 1 has software resources 2, an activation unit 3, and hardware resources 4. The software resources 2 include an application layer 5 and a common platform 6. The activation unit 3 is first activated when the hybrid imaging apparatus 1 is powered up, and it then activates the application layer 5 and the common platform 6. To activate the application layer 5 and the common platform 6, the activation unit 3 reads the programs for the application layer 5 and the common platform 6 from the hard disk drive (HDD), and transmits the respective programs to the corresponding memory areas.

The hardware resources 4 include a black-and-white laser printer (B&W LP) 11, a color laser printer (Color LP) 12, and other hardware resources 13, such as a scanner and a facsimile unit.

The application layer 5 is activated based on the operating system (OS), such as UNIX (registered trademark), and includes various programs, each carrying out a unique process for the user service in association with the corresponding imaging function, such as a printer, a copying machine, a facsimile machine, or an image scanner. In the example shown in FIG. 4, the application layer 5 includes printer application 21, photocopy application 22, facsimile application 23, scanner application 24, and other application software (not shown) executed by programs for generating image data.

The common platform 6 includes a control service layer 9, a system resources manager (SRM) 39, and a handler layer 10. The control service layer 9 interprets a job request supplied from the application layer 5, and generates an acquirement request for acquiring necessary hardware resources 4. The system resource manager (SRM) 39 manages one or more hardware resources 4, and coordinates the acquirement requests generated by the control service layer 9. The handler layer 10 allocates the hardware resources 4 in response to the acquirement requests generated by the SRM 39.

The control service layer 9 includes one or more service modules, such as network control service (NCS) 31, delivery control service (DCS) 32, operation panel control service (OCS) 33, facsimile control service (FCS) 34, engine control service (ECS) 35, memory control service (MCS) 36, user information control service (UCS) 37, and system control service (SCS) 38.

The common platform 6 also has an API (application programming interface) 53, which allows the job requests generated by the application layer 5 to be correctly received at the common platform 6 based on the prescribed functions.

The operating system (OS) executes the programs of the application layer 5 and the common platform 6 in parallel.

NCS (network control service) 31 provides a service that can be used in common among the applications that require network I/O. For example, the NCS process allocates the data received from the network via the respective protocols to the corresponding application, and transmits the data supplied from the respective applications to the network. The NCS 31 controls data communications with network equipment connected via the network to the hybrid imaging apparatus 1 based on HTTP (hypertext transfer protocol), by means of httpd (hypertext transfer protocol daemon).

DCS (delivery control service) 32 regulates delivering accumulated documents. OCS (operation panel control service) 33 controls the operation panel, which functions as information input means for allowing the operator to input necessary information to control the hybrid imaging apparatus 1. FCS (facsimile control service) 34 provides an application programming interface for allowing facsimile transmission from the application layer 5 via PSTN or ISDN, registration and citation of various facsimile data stored in the backup memory, and receipt and printing of facsimile data.

Figure 5:
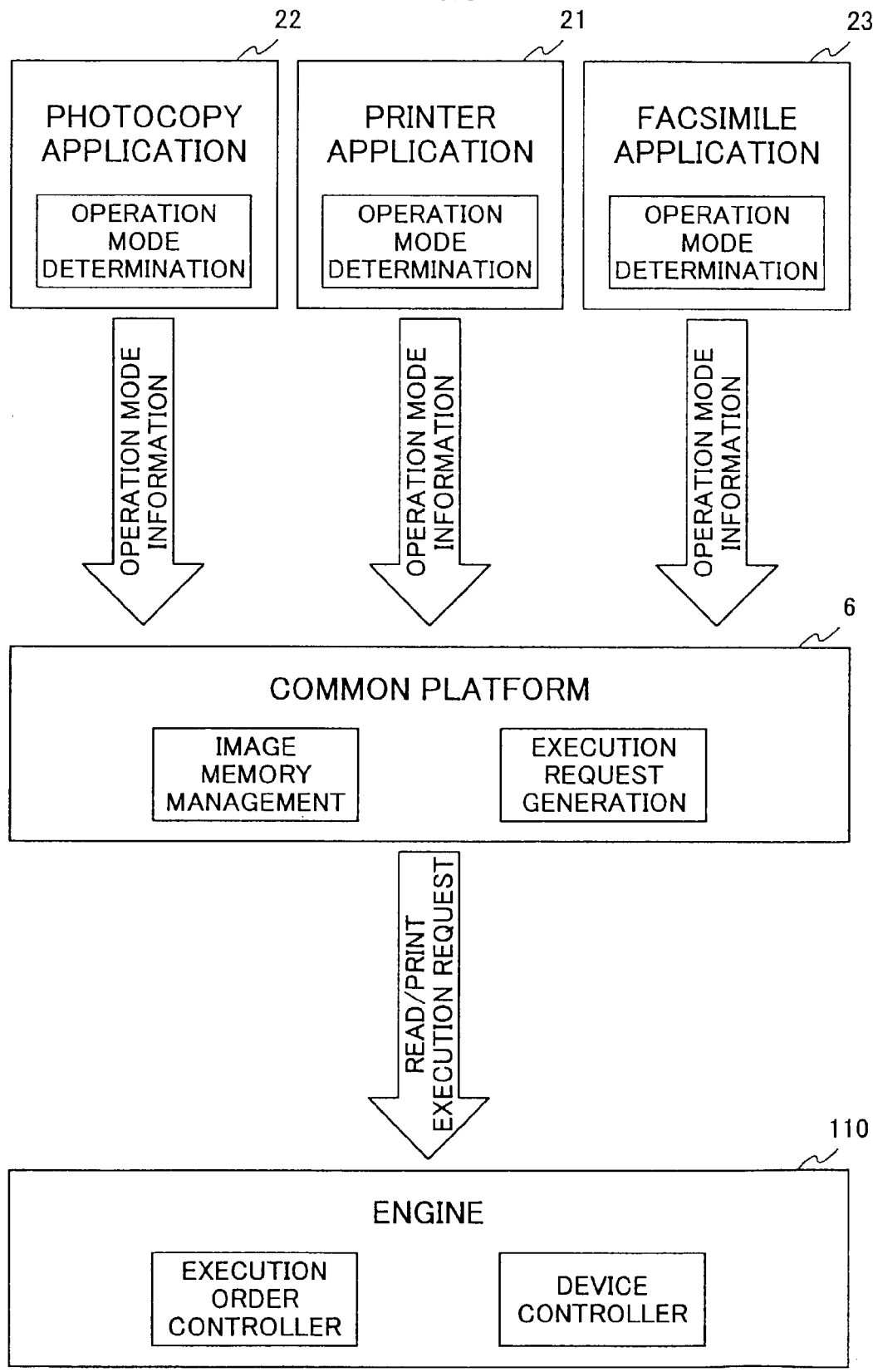
FIG. 5 illustrates the relation between applications, common platform, and the engine according to the invention.

ECS (engine control service) 35 controls the engine 110 (FIG. 5). Engine 110 includes the black-and-white laser printer 11, the color laser printer 12, and the hardware resources 13, and causes image data produced by the applications 21-24 to be reproduced. MCS (memory control service) 36 controls acquirement and release of memory areas, as well as usage of HDD. UCS (user information control service) 37 manages user information.

SCS (system control service) 38 manages applications, hardware resources, manipulation unit, the system display, and the LED display. It also controls applications interrupts.

SRM (system resources manager) 39 controls the system and the hardware resources 4, in cooperation with the SCS (system control service) 38. For example, the system resources manager (SRM) 39 adjusts the acquirement requests supplied from the higher layer, and acquires necessary hardware resources 4, such as the black-and-white laser printer 11 or and color laser printer 12. SRM 39 also regulates execution of such acquirement requests.

To be more precise, the system resources manager (SRM) 39 determines whether or not the hardware resources designated by the acquirement request are available (that is, whether or not the hardware resources are currently occupied by other acquirement requests). If the designated hardware resources 4 are available, the system resources manager (SRM) 39 informs the higher layer of availability. The system resources manager (SRM) 39 also schedules actual use of the hardware resources 4, and directly controls execution of the contents of the process requests (such as paper supply and image reproduction by the printer engine, acquirement of memory area, and generation of a file).

The handler layer 10 includes facsimile control unit handler (FCUH) 40 and image memory handler (IMH) 41. The facsimile control unit handler (FCUS) 40 administers the facsimile control unit 80 shown in FIG. 6, which will be described below. The image memory handler (IMH) 41 allocates a memory area to a process, and controls the allocated memory area. The system resources manager (SRM) 39 and the facsimile control unit handler (FCUH) 40 request the hardware resources 4 to execute the process via the engine I/F 54, which allows the execution request to be transmitted from the common platform 6 to the hardware resources 4 based on the prescribed functions.

The engine control service (ECS) 35, the system control service (SCS) 38, the system resources manager (SRM) 39, and the image memory handler (IMH) 41 cooperate and function as an image data regulation manager. The image data regulation manger comprises a common platform 6 that is used in common among the different types of applications 21-24, and is configured to interface with the image data generated by these applications.

According to the above-described layer structure, the hybrid imaging apparatus 1 is capable of collectively accomplishing print jobs produced by various applications 21-24 at the common platform 6.

FIG. 5 illustrates the relation between applications, the common platform 6, and an engine 110. Application software illustrated in FIG. 5 all relates to imaging functions, including printer application 21, photocopy application 22, and facsimile application 23. These applications utilize the common platform 6 in common. The common platform 6 interfaces between the applications and the engine 110. The engine 110 causes the image data produced by the different applications to be appropriately reproduced on paper (or any recording medium).

As has been described in connection with the prior art, in the conventional hybrid imaging apparatus, applications produce execution requests (a read/print request) that are independent from each other, and these execution requests act directly on the engine, as illustrated in FIG. 1. In contrast, in the hybrid imaging apparatus 1 of the present invention, each application simply provides notice of the operation mode of the print job to the common platform 6. The common platform 6 regulates the operation mode notices transmitted from different applications, and generates process execution requests, as illustrated in FIG. 5. The notices are produced by the respective applications in accordance with a unified rule so as to be treated on the same basis by the common platform 6.

With the conventional hybrid imaging apparatus, if the engine differs, the application also has to be changed because the application acts directly on the engine. In contrast, with the hybrid imaging apparatus 1 of the present invention, the common platform 6 absorbs such a change in engine, and therefore, no change is made to the applications. This arrangement eliminates developing steps for generating source code and debugging accompanying changes in applications. The "engine" used in this specification includes firmware for controlling the engine, and accordingly, "changes in engine" means not only mechanical changes made to the engine, but also changes in firmware.

Figure 2A:
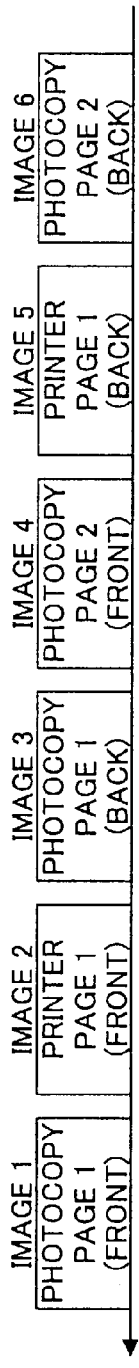
FIGS. 2A through 2C are diagrams for explaining the drawback of the conventional hybrid imaging apparatus when conducting duplex jobs from different applications.
Figure 2B:
Figure 2C:
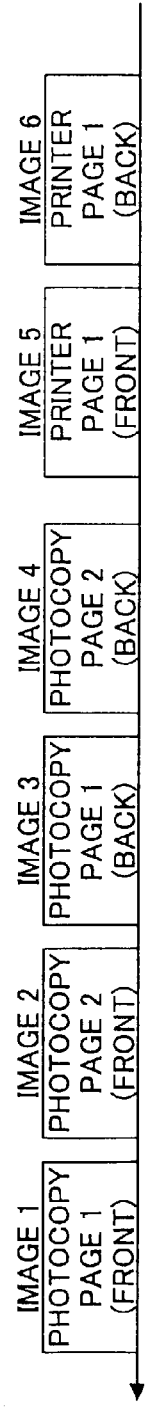

Since the common platform 6 adjusts and regulates the job requests form different applications, time loss or waiting time occurring in the engine of the conventional hybrid imaging apparatus (illustrated in FIG. 2) can be prevented according to the present invention. The arrangement shown in FIG. 5 can also efficiently prevent interruption due to a shortage of fee payment when a certain print job is a chargeable job, the details of which will be described below. Thus, the common platform 6 has many advantages, which is preferable to both applications and the engine 110.

Figure 6:
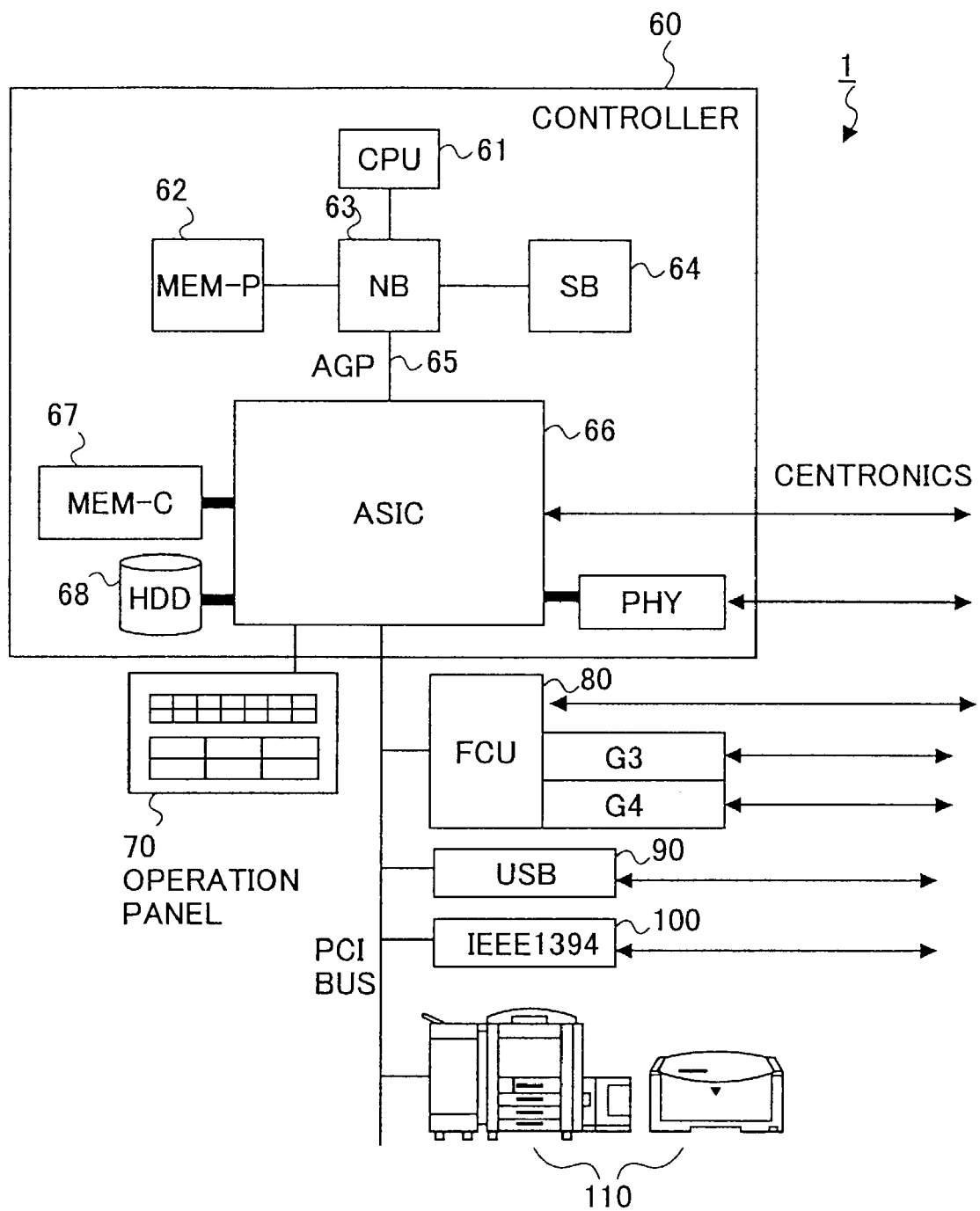
FIG. 6 illustrates the hardware structure of the hybrid imaging apparatus according to an embodiment of the invention.

FIG. 6 illustrates the hardware structure of the hybrid imaging apparatus 1 according to an embodiment of the invention. The hybrid imaging apparatus 1 includes a controller 60, an operation panel 70, an FCU (facsimile control unit) 80, a USB device 90, an IEEE1394 device 100, and an engine 110 that corresponds to imaging means.

The controller 60 has a CPU 61, a system memory (MEM-P) 62, a north bridge (NB) 63, a south bridge (SB) 64, an ASIC 66, a local memory (MEM-C) 67, and HDD 68.

The operation panel 70 is connected to the ASIC 66 of the controller 60. The FCU (facsimile control unit) 80, the USB device 90, the IEEE1394 device 100, and the engine 110 are also connected to the ASIC 66 via the PCI bus.

In the controller 60, the local memory (MEM-c) 67, and the HDD 68 are connected to the ASIC 66. The CPU 61 is also connected to the ASIC 66 via the north bridge (NB) 63, which is included in the CPU chip set. Connecting the CPU 61 with the ASIC 66 via the north bridge (NB) 63 can accommodate the case in which the interface of the CPU 61 is not open to the public.

The ASIC 66 and the north bridge (NB) 63 are connected with each other by the AGP (accelerated graphics port) 65, instead of the low-speed PCI bus, in order to prevent the performance from lowering. Consequently, one or more processes for defining the application layer 5 and the common platform 6 (shown in FIG. 4) are executed and controlled at a high rate.

The CPU 61 controls the entire operations of the hybrid imaging apparatus 1. The CPU 61 activates NCS 31, DCS 32, OCS 33, FCS 34, ECS 35, MCS 36, UCS 37, SCS 38, SRM 39, FCUH 40, and IMH 41, which comprises the control service layer 9 of the common platform 6 shown in FIG. 4. Each of these elements is executed as a process of the operating system. The CPU 61 also activates printer application 21, photocopy application 22, facsimile application 23, and scanner application 24, which together comprise the application layer 5 as illustrated in FIG. 4.

The north bridge (NB) 63 connects the CPU 61, the system memory (MEM-P) 62, the south bridge (SB) 64, and the ASIC 66 with each other. The system memory 62 is used as a drawing memory in the hybrid imaging, apparatus 1. The south bridge (SB) 64 connects the north bridge (NB) 63 with ROM (not shown), PCI bus, and peripheral devices. The local memory (MEM-C) 67 is used as an image buffer for photocopy or a code buffer.

ASIC 66 is an integrated circuit for use in image processing, and it has hardware components for image processing. HDD 68 is storage for storing image data, document data, programs, font data, and forms. The operation panel 70 allows the operator to input data, and displays necessary information to the operator.

Figure 7:
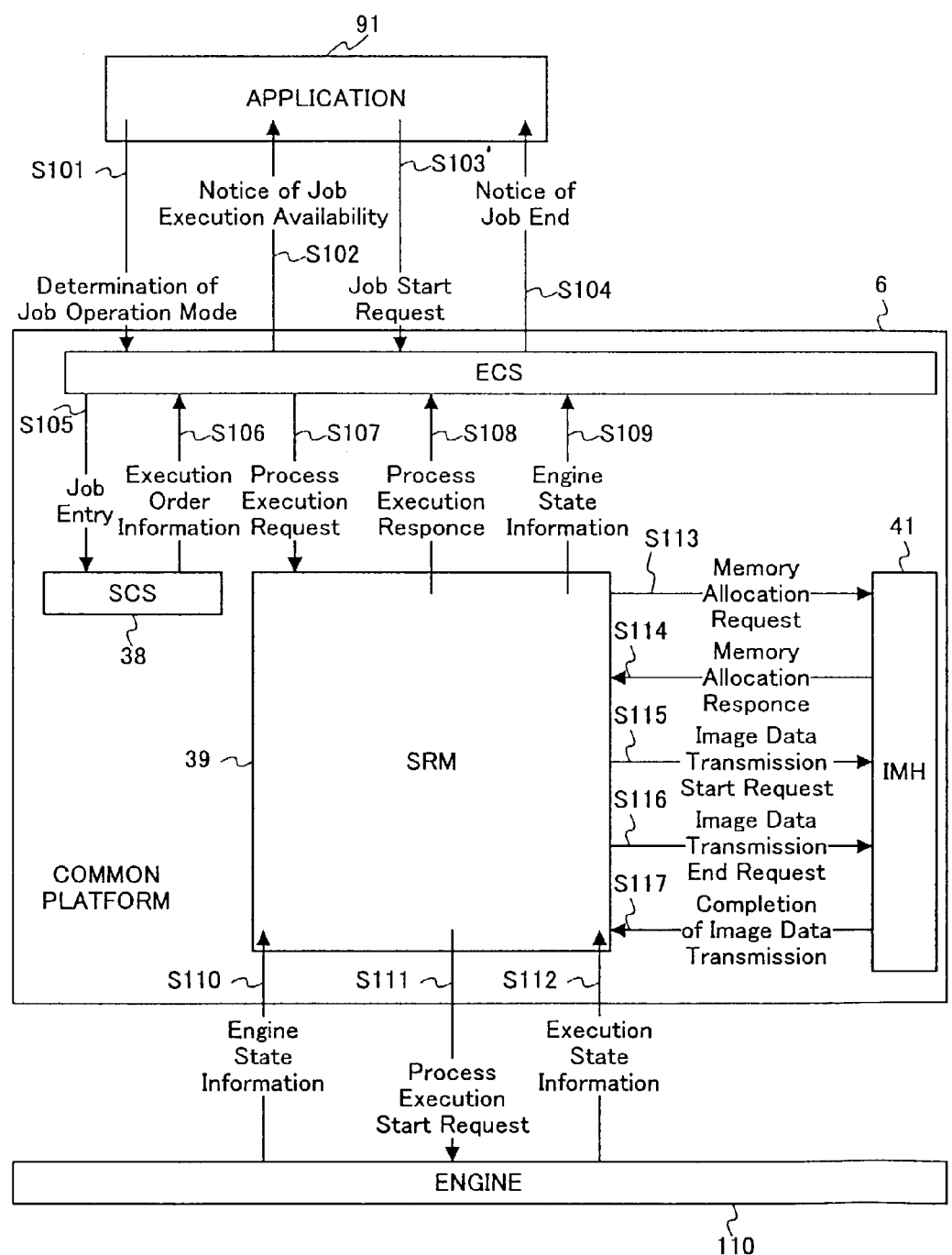
FIG. 7 illustrates detailed operations of the common platform shown in FIG. 5.

FIG. 7 illustrates the detailed software structure that is associated with the execution of print requests. In FIG. 7, ECS (engine control service) 35, SCS (system control service) 38, SRM (system resources manager) 39, and IMH (image memory handler) 41 in the common platform 6 are involved in causing the engine 110 to execute print requests from different applications 91. The common platform 6 is used in common by different applications. The ECS 35, SCS 38, SRAM 39, and IMH 41 cooperate and coordinate image data designated by different applications. The ECS 35, SCS 38, SRAM 39, and IMH 41 comprise an image data manager. On the other hand, the engine 110 functions as image reproduction means.

In operation, a job is a relatively large set of processes. Each process is a subdivision for completing the job. For example, a print job includes a paper supply process, a set of processes for reproducing images on paper, a printed paper ejection process, and other necessary processes. In general, each process is independent of each other.

In the example shown in FIG. 7, a certain application 91 generates image data, and requests the common platform 6 to have the image data reproduced. First, application 91 provides notice of the job operation mode to the ECS 35

(S101). The job operation mode includes, for example, print mode, such as duplex or simplex, and designation of paper size.

When receiving the job operation mode from the application, the ECS 35 determines whether or not execution of the designated job is possible (that is, whether or not system is capable and available), based on the engine state or other factors. Then, the ECS 35 provides notice of availability of job execution to the application 91 (S102). If the job execution is available, the application 91 issues a job start request to the ECS 35 (S103). If the job execution is unavailable, the application 91 outputs an error, or retries to set the operation mode, depending on the reason for unavailability. Based on the job start request issued in S103, the job (i.e., a print job) is to be executed. After the job is executed, the ECS provides notice of completion of the job to the application 91 (S104).

In this manner, application 91 confirms whether or not the job is executable in the designated operation mode, then, issues a job start request if the job is executable. The ECS 35 conducts communications between the common platform 6 and the application 91.

Next, operations between ECS 35 and SCS 38 will be explained. ECS 35 supplies a job entry notice to the SCS 38 (S105). The SCS 38 returns a job execution order to the ECS 35 (S106). In this manner, the ECS can inquire of the SCS 38 about the order of execution of the job requested by the application 91. These steps are taken to adjust the order when multiple jobs from different applications run simultaneously, for example, sending facsimile during photocopying.

Next, operations between ECS 35 and SRM 39 will be explained. If the job requested by the application 91 is executable without waiting according to the job execution order information supplied from the SCS 38, the ECS 35 organizes the job into processes (i.e., subdivisions), and transmits a process execution request to the SRM 39 (S107). The SRM 39 returns a response to the process execution request for each process to the ESC 35 (S108). When ECS 35 receives execution responses for all the processes, it means that the job has been completed, and therefore, the ECS 35 transmits a job end notice to the application 91 in S104, as has been described above. The SRAM 38 supplies engine state information, which was originally supplied from the engine 110 in S110, to the ECS 34 (S109). The ECS 34 determines availability of job execution based on the engine state information, and produces a notice of job execution availability, which is supplied to the application 91 in S102.

Next, operations among SRM 39, the engine 110, and IMH 41 will be explained. When receiving the process execution request from the ECS 35, the SRM 39 converts each process into parameter information decodable for the engine 110, and at the same time, it determines the order of executing the processes. The parameter information is supplied to the engine 110, together with a process execution start request (S111).

If the process requires an image memory area, for example, when reading an image by a scanner, the SRM 39 requests the IMH 41 to allocate a memory area for storing the image data (S113). The IMH 41 returns a response to the memory allocation request (S114). Then, SRM 39 transmits an image data transmission start request to the IMH 41 (S115), as well as an image data transmission end request (S116). When all the image data has been transmitted, IMH 41 provides notice of the completion of transmission of image data to the SRM 39 (S117). In this manner, SRM 39 prepares a memory area for image data.

Returning to the operation between SRAM 39 and the engine 110, the SRM 39 transmits a process execution start request S111 to the engine, and the engine 110 informs the SRM 39 of the execution state of the requested process (S112). Examples of execution state include the fact that paper is being supplied. By receiving the execution state information, SRM 39 recognizes that the process has been executed.

FIG. 8 illustrates how the common platform 6 processes image data from different applications prior to transmitting the image data to the engine 110. In the example shown in FIG. 8, image data 93 generated by photocopy application 22 is divided into multiple processes (subdivisions) that comprise an image data set 93*a* by the common platform 6. Similarly, image data 94 generated by printer application 21 is divided into multiple processes (subdivisions) that comprise an image data set 94*a* by the common platform 6. Then, the common platform 6 interleaves processes (i.e., subdivisions) of data sets 93*a* and 94*b* to generate transmission image information 95, which is to be supplied to the engine 110.

In the transmission image information 95 in which subdivisions of image data sets 93*a* and 94*a* are mixed, four subdivisions of image data from photocopy application 22 continue, then two subdivisions of image data from printer application 21 appear successively. The number of successive subdivisions of image data is determined based on the information about that image data, for example, the number of subdivisions, or print priority of that image data. In the examples shown in FIG. 8, the image data 93 from photocopy application 22 is divided into forty subdivisions, and the image data 94 from printer application 21 is divided into twenty subdivisions. Alternatively, image data 93 created by photocopy application 22 has a higher priority over image data 94 created by printer application 21.

Then, the engine 110 actually carries out printing operation based on the transmission image information 95 supplied from the platform 6.

Figure 9A:
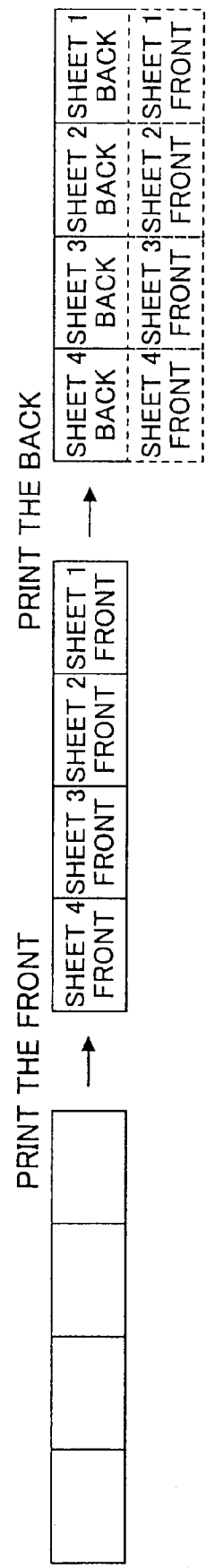
FIGS. 9A and 9B illustrate examples of printing order for duplex.
Figure 9B:

FIG. 9A and FIG. 9B illustrate examples of how the engine 110 actually reproduces images on paper. In FIG. 9A, images are reproduced on one side (for example, on the front side) of several successive sheets. Then, counterpart images are reproduced on the other side (for example, on the back side) of said successive sheets so as to increase the printing rate.

In FIG. 9B, engine 110 reproduces images on the back side and the front side alternately for each sheet. For example, an image is printed on the front side of sheet 1, then an image is printed on the back side of the same sheet 1. Then, images are formed on the front side and the back side of sheet 2. These two modes can be switched depending on the situation, which sill be explained below.

Figure 10B:
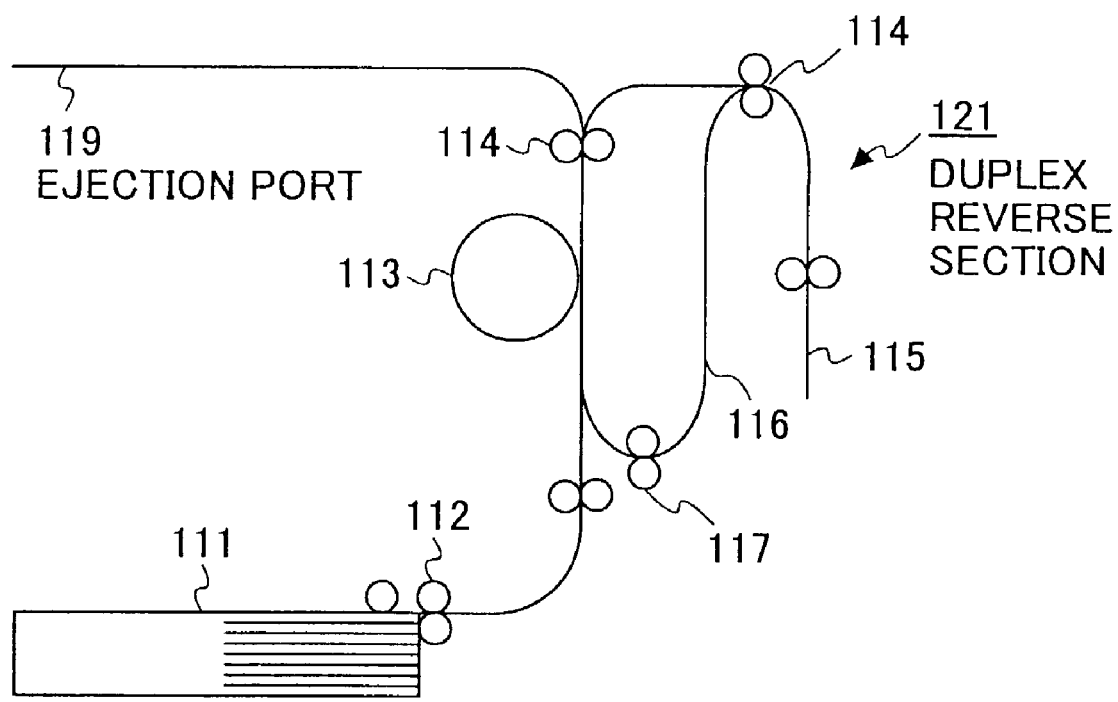

FIG. 10A and FIG. 10B illustrate examples of paper transport paths including a reverse used in the hybrid imaging apparatus 1 to conduct duplex print operations. In FIG. 10A and FIG. 10B, the paper-supply rollers 112 pick up a sheet (sheet 1) from the paper-supply tray 111, and feed sheet 1 to the reproduction unit 113. The reproduction unit 113 reproduces an image on the front side of sheet 1. Then, sheet 1 is transported to the path switching unit 114. The path switching unit 114 switches the transport path toward the duplex reverse section 121 to guide sheet 1 toward the reverse position 115. At the same time, the paper-supply rollers 112 pick up sheet 2 from the paper-supply tray 111, and feed sheet 2 to the reproduction unit 113. While sheet 2 is fed to the reproduction unit 113, movement of sheet 1 is reversed at the reverse position 115, and transported to the duplex paper feed path 116. Sheet 1 waits at the duplex paper feed path 116 until an image is formed on the front side of sheet 2.

When the image is reproduced on the front side of sheet 2, the duplex paper-feed rollers 117 feed sheet 1 again to the reproduction unit 113 to form an image on the back side of sheet 1. At this time, sheet 2 is guided to the duplex reverse section 121 from the path switching unit 114. Then, sheet 2 is switched back at the reverse position 115, and transported to the duplex paper feed path 116. Upon completing reproduction of the image on the back side of sheet 1, sheet 1 is ejected from the ejection port 119 by the path switching unit 114. During the ejection of sheet 1, sheet 2 is supplied to the reproduction unit 113 by the duplex paper-supply rollers 117. After an image is reproduced on the back side of sheet 2, sheet 2 is ejected from the ejection port 119.

This method is called a doublet (or two-sheet) interleave. Using the doublet interleave, while a sheet is reversed for image reproduction on the back side, another image is formed on the front side of the next sheet. Accordingly, lost time can be greatly reduced in image reproduction. Triplet or higher interleave, in which an image is formed on the front sides of sheet 2, sheet 3, and subsequent sheets before the back side of sheet 1 is subjected to image reproduction, is also known. The basic operation of such interleaving is the same as in the doublet interleave explained above, and therefore, explanation for them will be omitted.

The hybrid imaging apparatus 1 can advantageously make use of an interleave technique when treating different print jobs from different applications, by coordinating these print jobs as has been described above.

Figure 11:
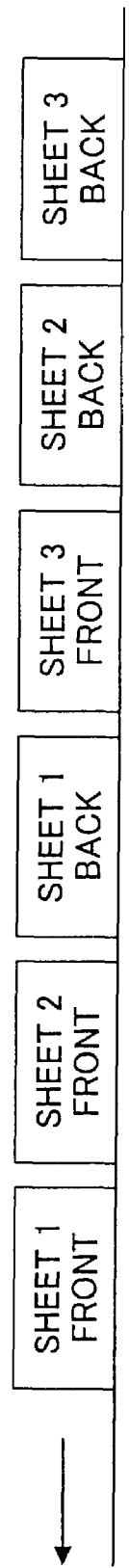
FIG. 11 illustrates an example of interleave for reproducing six sets of image data on both sides of three sheet.

FIG. 11 illustrates an example in which six images are reproduced on both sides of three sheets using the doublet interleave technique. In this example, the following steps are taken.

1) Feeding sheet 1 to the reproduction unit 113 in order to reproduce an image on the front side.
2) Feeding sheet 2 to the reproduction unit 113 in order to reproduce an image on the front side.
3) Reversing sheet 1 and supplying reversed sheet 1 to the reproduction unit 113 to reproduce an image on the back side.
4) Feeding sheet 3 to the reproduction unit 113 in order to reproduce an image on the front side.
5) Reversing sheet 2 and supplying reversed sheet 2 to the reproduction unit 113 to reproduce an image on the back side.
6) Reversing sheet 3 and supplying reversed sheet 3 to the reproduction unit 113 to reproduce an image on the back side.

With this arrangement, more images can be reproduced on the subsequent sheets, while a sheet having an image on one side is reversed in the duplex reverse unit. Consequently, productivity increases, as compared with printing on the front side and the back side alternately for each sheet.

Figure 12:
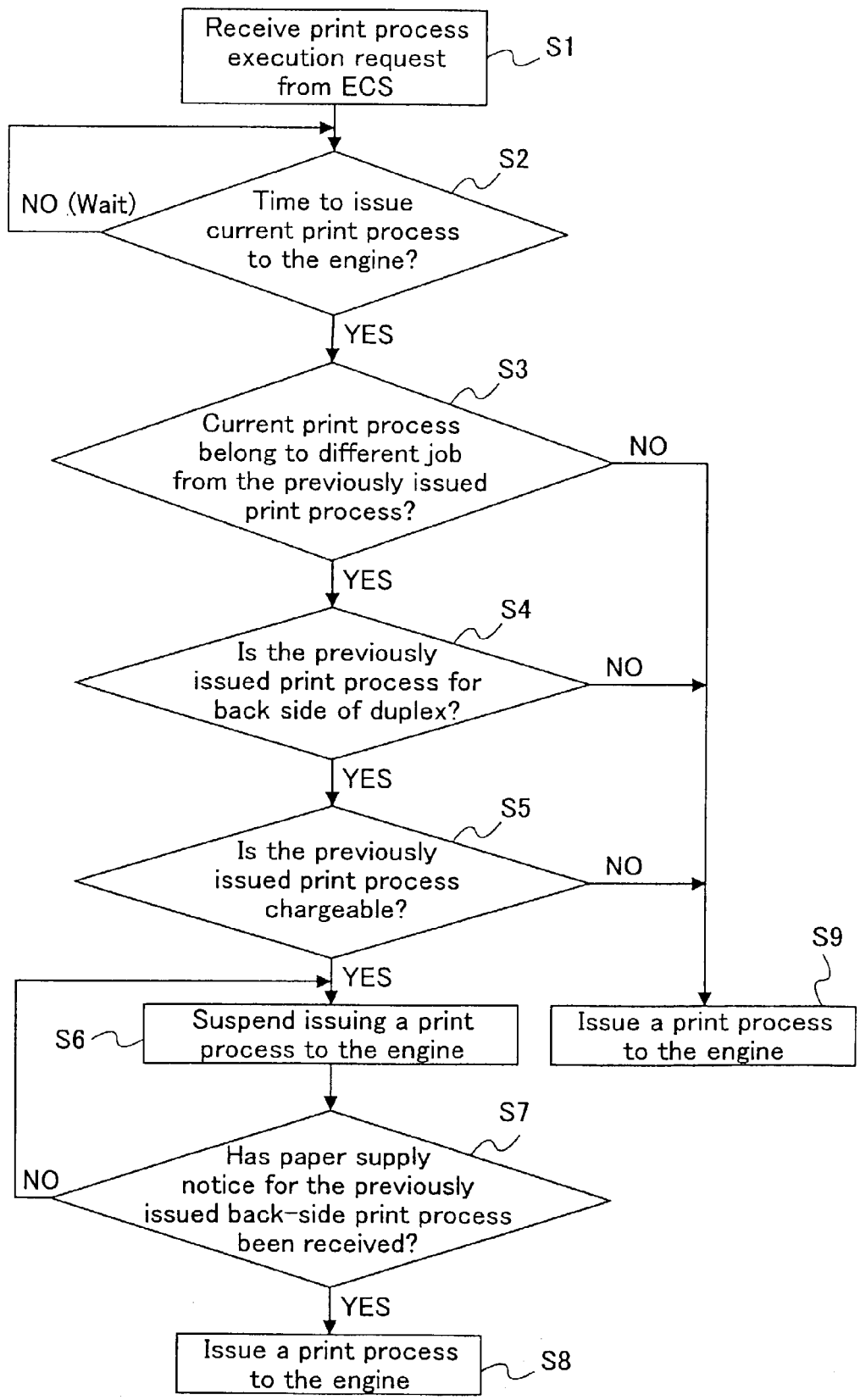
FIG. 12 illustrates an operational flow of SRM (system resources manager) of the common platform when conducting duplex print operations with interleaving.

FIG. 12 illustrate an operation flow of SRM 39 (FIG. 7) when the hybrid imaging apparatus 1 carries out printing operations for print jobs from different applications, using an interleave technique. The operation flow takes into account a pay service as an example of causing duplex print operation to be suspended. In this case, a certain service fee is charged for each process. For example, a fee is charged at the time of supplying a sheet from the paper-supply tray 111 for image reproduction on the front side of this sheet. When reproducing an image on the back side of the sheet, a fee is again charged at the time of feeding the sheet from the duplex reverse section 121. If images are reproduced on both sides (i.e., the front side and the back side) of the sheet, this sheet is ejected and the printing operations for this sheet will have been completed.

When receiving a notice that paper supply has been started for an issued print process from the engine 110, SRM 39 issues a new process execution start request to the engine 110. The notice about the condition of paper supply is an example of the process execution state notice, which is transmitted from the engine 110 to the SRM 39 in S112 shown in FIG. 5.

Returning to FIG. 12, SRM 39 receives a print process execution request from ECS 35 (S1). SRM 39 determines whether it is time to issue the current print process requested by the ECS 35 to the engine 110 (S2). This determination is made based on whether any paper-supply notice for an already issued front-side print process has been received at SRM 39. If a paper supply notice has been received from the engine 110, namely, if paper has been supplied from the paper-supply tray for the already issued print process, the SRAM 39 determines that it is time to issue the current print process to the engine (YES in S2). If a paper-supply notice has not been received at SRM 39 (NO in S2), SRM 39 waits until a paper supply notice is received from the engine 110.

If it becomes a time to issue the current print process to the engine 110 (YES in S2), SRM 39 then determines whether or not the current print process belongs to a different job from the previous print process that was issued immediately before the current process (which is referred to as the "previously issued print process") (S3). If the current print process belongs to the same job as the previously issued print process (NO in S3), SRM 39 issues the current print process to the engine 110 (S9). If the job of the current print process is different from that of the previously issued print process (YES in S3), SRM 39 then determines whether or not the previously issued print process is directed to image reproduction on the back side for duplex print (S4).

If the previously issued print process is not directed to image reproduction on the back side (NO in S4), SRM 39 issued the current print process to the engine 110 (S9). If the previously issued print process is directed to image reproduction on the back side for duplex (YES in S4), SRM 39 then determines whether or not the previously issued print process is chargeable (S5).

If the previously issued print process is not chargeable (NO in S5), SRM 39 issues a current print process to the engine 110 (S9). If the previously issued print process is chargeable (YES in S5), SRM 39 suspends issuing the current print process to the engine (S6). Consequently, the next sheet is withheld from being supplied from the paper-supply tray. Then, SRM 39 determines whether or not a paper-supply notice has been received for the previously issued back-side print process (S7). This determination step may be restated as whether or not the sheet located in the duplex reverse section 121 has been fed to the reproduction unit 113 for reproducing an image on the back-side of this sheet.

If a paper-supply notice for the previously issued back-side print process has been received (YES in S7), it is guaranteed that discontinuation (or interruption) due to shortage of fee payment or non-payment of money will not occur for this duplex copy. Then, SRM 39 issues the suspended print process to the engine 110 (S8). Without a paper-supply notice for the previously issued back-side print process (NO in S7), a sheet bearing an image on the front side still remains in the duplex reverse section 121 (FIG.

10A or 10B), and therefore, the SRAM 39 suspends issuing the current print process (S6).

In this manner, if there is a possibility that the duplex reverse section 121 is unavailable, the paper supply timing for feeding a sheet from the paper-supply tray 111 is put off from the regular timing, thereby preventing the subsequent processes from being interrupted due to, for example, paper jam in the duplex reverse section 121.

Figure 13:
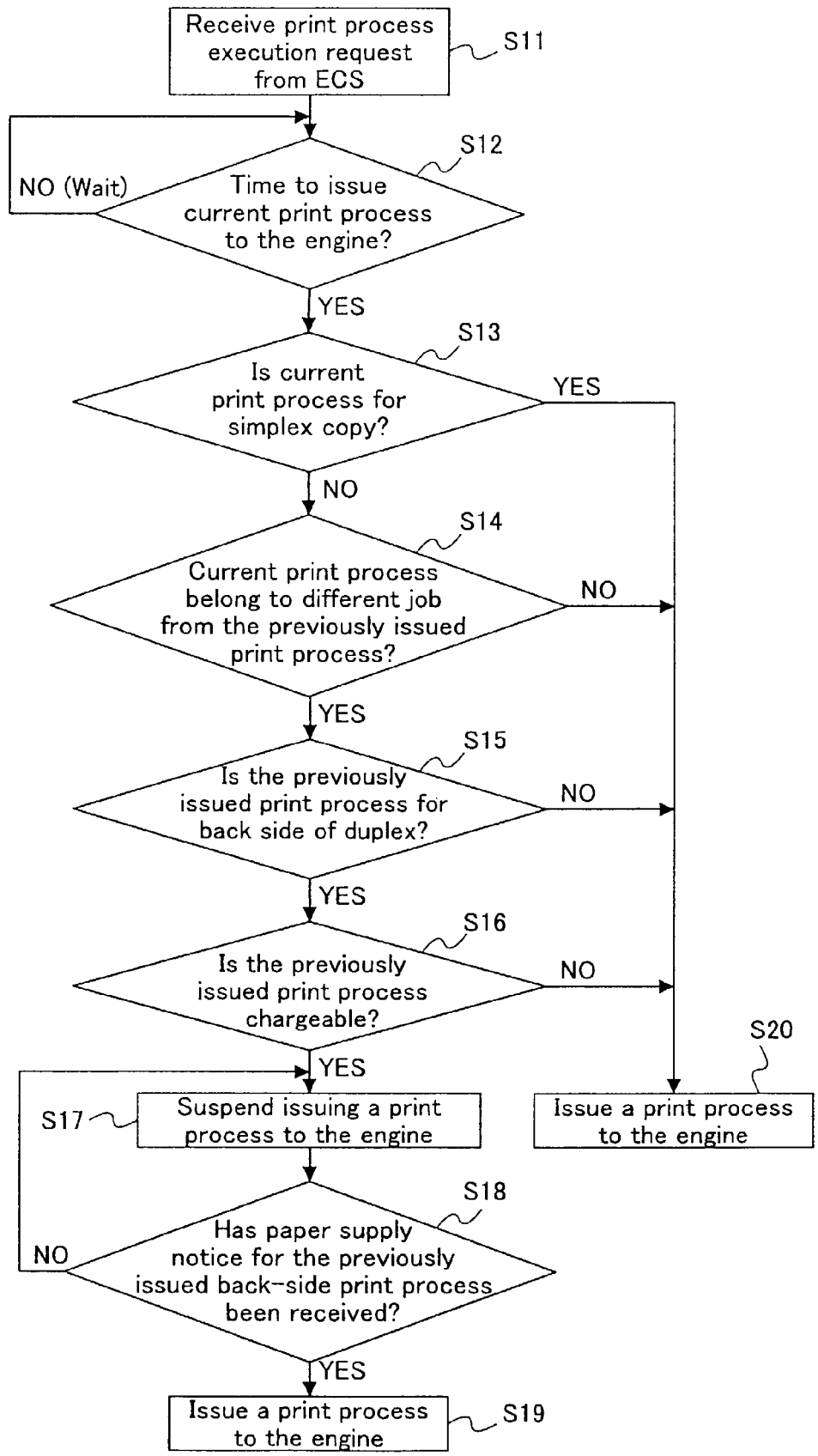
FIG. 13 illustrates an operational flow of SRA when duplex print jobs and simplex print jobs are mixed.

FIG. 13 illustrates an operation flow further improving the productivity, taking into account the situation in which the current print process is for simplex copying. In this case, since an image is reproduced only on one side of a sheet, there is little possibility that paper will become stuck in the duplex reverse section 121 even if the previous supplied duplex sheet remains in the duplex reverse section 121. Accordingly, a print process is issued to the engine. To this end, in the flowchart shown in FIG. 13, a determination step for determining whether the current print process is for simplex copying is inserted between steps S2 and S3 shown in FIG. 12. The other steps are the same as those shown in FIG. 12.

To be more precise, SRM 39 receives a print process execution request from ECS 35 (S11). SRM 39 determines whether it is time to issue the current print process requested by the ECS 35 to the engine 110 (S12). If it is not time to issue the current print process to the engine 110 (NO in S12), then SRM 39 waits until time has come. If it is time to issue the current print process, that is, if a paper-supply notice for an already issued front-side print process has been received from the engine 110 (YES in S12), SRM 39 determines whether the current print process is for simplex copy (S13). If the current print process is for simplex copy (YES in S13), SRM 39 issues the print process to the engine 110 (S20).

Since the simplex printing operation is not affected by the condition in the duplex reverse unit, the current print process is executed regardless of whether the previously issued duplex print process is suspended due to lack of payment. Consequently, productivity can be maintained high even in the interleaving printing operations.

If the current print process is not for simplex copying (NO in S13), then SRM 39 determines whether or not the job of the current print process is different from that of the previously issued print process (S14). If the current print process and the previously issued print process belong to the same job (NO in S14), SRM 39 issues the current print process to the engine 110 (S20). If the job of the current print process is different from that of the previously issued print process (YES in S14), SRM 39 then determines whether or not the previously issued print process is directed to image reproduction on the back side for duplex print (S15).

If the previously issued print process is not directed to image reproduction on the back side (NO in S15), SRM 39 issued the current print process to the engine 110 (S20). If the previously issued print process is directed to image reproduction on the back side for duplex (YES in S15), SRM 39 then determines whether or not the previously issued print process is chargeable (S16).

If the previously issued print process is not chargeable (NO in S16), SRM 39 issues a current print process to the engine 110 (S20). If the previously issued print process is chargeable (YES in S16), SRM 39 suspends issuing the current print process to the engine (S17), and determines whether or not a paper-supply notice has been received for the previously issued back-side print process (S18). If a paper-supply notice for the previously issued back-side print process has not been received (NO in S18), it is likely that the subsequent printing operation is interrupted, and therefore, SRM 39 suspends issuing the current print process to the engine 110 (S17). On the other hand, if a paper-supply notice for the previously issued back-side print process has been received (YES in S18), SRM 39 issues the suspended print process to the engine 110 (S19).

During the operation, if the duplex reverse section 121 becomes unavailable, the priority of jobs may be adjusted. For example, higher priority may be given to a simplex print job, while suspending duplex print jobs. This will be explained with reference to FIGS. 14A through FIG. 14D.

For example, jobs A through H are to be executed in the order of priority shown in FIG. 14A. Job A is currently executed under the first priority. Job B under the second priority is directed to duplex copy. In this state, if job A stops halfway due to, for example, lack of payment, the duplex reverse section 121 becomes unavailable.

Then, the priority is changed, and the highest priority is given to simplex print job D, as shown in FIG. 14B. Thus, the hybrid imaging apparatus keeps on executing printing operations, even if the duplex reverse section 121 becomes unavailable. The output of job D may be sorted out from the output of job A.

If the duplex reverse section 121 is still unavailable even after job D is finished, then, the priority is given to another simplex job F, as illustrated in FIG. 14C.

If job A becomes available during the execution of job D in response to making additional payment to the pay unit 900, job A resumes, while returning job D to the former order of priority, as illustrated in FIG. 14D. This can be realized even if these jobs are from different types of applications.

In this manner, the productivity of the hybrid imaging apparatus can be maintained high, without much changing the order of priority, even if the duplex reverse section 121 becomes unavailable.

The priority adjustment may be carried out manually through a user's manipulation. For example, the user may not satisfy the priority adjustment shown in FIG. 14D because job D is suspended when job A resumes. In this case, the user can set the priority so that job A resumes when job D has been completed. Thus, the productivity of the hybrid imaging apparatus can be maintained high with the preferable order of execution, even if the duplex reverse section 121 becomes unavailable halfway through the operation.

In conclusion, with the hybrid imaging apparatus and the print control method according to the invention, productivity is maintained high even if multiple different types of print jobs are carried out.

Although the present invention has been described using specific examples, the invention is not limited to these examples, and there are many substitutions and modifications that can be made without departing from the scope of the invention. For example, the medium fed in the hybrid imaging apparatus is not limited to paper, but includes any type of recording medium.

This patent application is based on and claims the benefit of the earlier filing date of Japanese patent application Nos. 2001-289545, 2001-364630, and 2002-262339 filed Sep. 21, 2001, Nov. 29, 2001, and Sep. 9, 2002, respectively, the entire contents of which are hereby incorporated by reference.

What is claimed is:

1. An imaging apparatus, comprising:
   image processing hardware resources;

a plurality of imaging processing applications for performing image processing operations using the image processing hardware resources;

an operating system;

an engine configured to cause image data generated by the plurality of applications to be reproduced and to control an execution order of received process execution requests; and an image data regulation manager that includes a common software platform running on the operating system, accessible from said plurality of image processing applications, and used in common among the applications to interface the engine with the applications, wherein the common software platform is configured to receive operation mode information from each of the plurality of applications according to a unified rule and to issue process execution requests to the engine based on the received operation mode information and to directly control execution of a print job received from any one of the plurality of applications in a common manner, independently of the plurality of applications;

the plurality of applications are not configured to issue process execution requests to the engine, but only the common software platform is configured to issue process execution requests to the engine; and wherein the operating system executes the plurality of image processing applications and the common software platform in parallel.

2. The imaging apparatus according to claim 1, wherein the image data regulation manager divides the image data generated by each of the applications into a plurality of subdivisions, and interleaves a subdivision of first image data with a prescribed number of successive subdivisions of second image data.

3. The imaging apparatus according to claim 2, wherein the image data regulation manager transmits the subdivision of the first image data to the engine and then transmits the successive subdivisions of the second image data to the engine.

4. The imaging apparatus according to claim 3, wherein the image data regulation manager determines a maximum number of the successive subdivisions to be transmitted to the engine based on conditions of the first image data and the second image data.

5. The imaging apparatus according to claim 4, wherein the conditions include a ratio of a total number of subdivisions of the first image data to a total number of subdivisions of the second image data.

6. The imaging apparatus according to claim 4, wherein the conditions include printing priority of the first image data and the second image data.

7. The imaging apparatus according to claim 2, wherein each of the subdivision corresponds to a block of image data that is to be reproduced on one side of a recording medium.

8. The imaging apparatus according to claim 7, wherein the image data regulation manager adds printing-side information representing on which side the recording medium is to be printed to each of the subdivisions, and transmits the subdivisions having the printing-side information to the engine.

9. The imaging apparatus according to claim 1, wherein when the print job is a duplex print job, the engine causes a portion of the image data to be successively reproduced on one side of each of a plurality of recording media, and then causes the remaining portion of the image data to be successively reproduced on the other side of each of said plurality of recording media so as to correspond to each of said one side.

10. The imaging apparatus according to claim 1, wherein when the print job is a duplex print job, the engine causes the image data to be reproduced on one side and on another side of the recording medium alternately for each recording medium.

11. The imaging apparatus according to claim 2, wherein if there is a possibility that reproduction of one of the subdivisions of the image data will be suspended during a duplex printing operation, the image data regulation manager withholds a next subdivision of the image data from being transmitted to the engine until said one of the subdivisions of the image data is reproduced.

12. The imaging apparatus according to claim 2, wherein if there is a possibility that reproduction of one of the subdivisions of the image data will be suspended during a duplex printing operation, a next recording medium is withheld from being supplied until said one of the subdivisions of the image data is reproduced.

13. The imaging apparatus according to claim 2, wherein if there is a possibility that reproduction of one of the subdivisions of the image data will be suspended during a duplex printing operation, the image data regulation manager gives priority to a simplex print job so as to cause the image data contained in said simplex print job to be reproduced prior to the other print jobs.

14. The imaging apparatus according to claim 2, wherein if there is not a possibility that reproduction of one of the subdivisions of the image data will be suspended during a duplex print job, the image data regulation manager allows subdivisions of other print jobs to be transmitted to the engine before all of the subdivisions of said duplex print job have been executed.

15. The imaging apparatus according to any one of claims 11 through 14, further comprising a duplex reverse section for allowing the recording medium having an image on one side to be reversed for the duplex printing operation, wherein said possibility of the suspension includes a case in which said recording medium having the image on one side is not fed out of the duplex reverse section.

16. The imaging apparatus according to any one of claims 11 through 14, further comprising a pay unit with a counter, wherein if said duplex printing operation is chargeable, said possibility of the suspension includes a case of lack of fee payment.

17. The imaging apparatus according to any one of claims 11 through 14, wherein the engine transmits an execution state notice to the image data regulation manager to indicate whether each of the subdivisions is going to be executed, and the image data regulation manager determines said possibility based on the execution state notice.

18. A print control method for controlling multiple print jobs requested from a plurality of image processing applications in an imaging apparatus, comprising the steps of:

providing a common software platform that runs on an operating system of the imaging apparatus and is accessible from said plurality of image processing applications so as to be used in common among the applications;

determining if there is a possibility that a duplex print job among the multiple print jobs will be suspended during a printing operation; and if there is the possibility of suspension, withholding a recording medium from being supplied into the imaging apparatus for other duplex jobs until the possibility of suspension is eliminated, wherein the common software platform is configured to receive operation mode information from each of the plurality of applications according to a unified rule and to issue process execution requests to an engine based on the received operation mode information and to directly control execution of a print job received from any one of the plurality of applications in a common manner, independently of the plurality of applications;

the plurality of applications are not configured to issue process execution requests to the engine, but only the common software platform is configured to issue process execution requests to the engine; and wherein the operating system executes the plurality of image processing applications and the common software platform in parallel.

19. A print control method for controlling multiple print jobs requested from a plurality of imaging processing applications in an imaging apparatus, comprising the steps of:

providing a common software platform that runs on an operating system of the imaging apparatus and is accessible from said plurality of image processing applications so as to be used in common among the applications;

determining if there is a possibility that a duplex print job among the multiple print jobs will be suspended during a printing operation; and if there is the possibility of suspension, causing another simplex print job to be executed, while suspending execution of the duplex print job, wherein the common platform is configured to receive operation mode information from each of the plurality of applications according to a unified rule and to issue process execution requests to an engine based on the received operation mode information and to directly control execution of a print job received from any one of the plurality of applications in a common manner, independently of the plurality of applications;

the plurality of applications are not configured to issue process execution requests to the engine, but only the common software platform is configured to issue process execution reciuests to the engine; and wherein the operating system executes the plurality of image processing applications and the common software platform in parallel.

20. A print control method according to claim 19, further comprising the step of:

if there is the possibility of suspension, and if said multiple print jobs include one or more simplex print jobs, then adjusting a print order of said multiple print jobs by giving higher priority to the simplex print jobs.

21. A print control method for controlling multiple print jobs requested from a plurality of image processing applications in an imaging apparatus, comprising the steps of:

providing a common software platform that runs on an operating system of the imaging apparatus and is accessible from said plurality of image processing applications so as to be used in common among the applications;

determining if there is a possibility that a first duplex print job among the multiple print jobs will be suspended during a printing operation; and if there is not the possibility of suspension, then reproducing at least a portion of another duplex print job before the first duplex print job has been completed, wherein the common software platform is configured to receive operation mode information from each of the plurality of applications according to a unified rule and to issue process execution requests to an engine based on the received operation mode information and to directly control execution of a print job received from any one of the plurality of applications in a common manner, independently of the plurality of applications;

the plurality of applications are not configured to issue process execution requests to the engine, but only the common software platform is configured to issue process execution requests to the engine; and wherein the operating system executes the plurality of image processing applications and the common software platform in parallel.

22. The print control method according to any one of claims 18 through 21, wherein it is determined that there is the possibility of suspension if a recording medium is not supplied into the imaging apparatus, or if a recording medium is not ejected from the imaging apparatus.

23. The print control method according to any one of claims 18 through 21, wherein it is determined that there is the possibility of suspension if reproduction of said one of multiple image data is chargeable, and if fee payment is not made.

24. A print control method for controlling multiple print jobs requested from a plurality of image processing applications in an imaging apparatus, comprising the steps of:

providing a common software platform that runs on an operating system of the imaging apparatus and is accessible from said plurality of image processing applications so as to be used in common among the applications;

receiving first image data of a first print job and second image data of a second print job from the plurality of image processing applications;

dividing each of said first and second image data into subdivisions and recombining the subdivisions into a series of transmission image information units that are to be reproduced on a plurality of recording media;

receiving an execution state notice for each subdivision, the execution state notice representing whether the associated subdivision is going to be executed;

determining whether there is a possibility that reproduction of one of the subdivisions will be suspended based on the execution state notice; and if there is the possibility of said suspension, withholding supplying the next recording medium until the possibility of said suspension is eliminated, wherein the common software platform is configured to receive operation mode information from each of the plurality of applications according to a unified rule and to issue process execution requests to an engine based on the received operation mode information and to directly control execution of a print job received from any one of the plurality of applications in a common manner, independently of the plurality of applications;

the plurality of applications are not configured to issue process execution requests to the engine, but only the common software platform is configured to issue process execution reciuests to the engine; and wherein the operating system executes the plurality of image processing applications and the common software platform in parallel.

25. A print control method for controlling multiple print jobs requested from a plurality of image processing applications in an imaging apparatus, comprising the steps of:

providing a common software platform that runs on an operating system of the imaging apparatus and is accessible from said plurality of image processing applications so as to be used in common among the applications;

receiving first image data of a first print job and second image data of a second print job from the plurality of image processing applications;

dividing each of said first and second image data into subdivisions and recombining the subdivisions into a series of transmission image information units that are to be reproduced on a plurality of recording media;

receiving an execution state notice for each subdivision, the execution state notice representing whether the associated subdivision is going to be executed;

determining whether there is a possibility that reproduction of a previous subdivision will be suspended based on the execution state notice; and if there is the possibility of said suspension, and if a current subdivision is directed to simplex printing, then allowing the current subdivision to be reproduced prior to the previous subdivision, wherein the common software platform is configured to receive operation mode information from each of the plurality of applications according to a unified rule and to issue process execution requests to an engine based on the received operation mode information and to directly control execution of a print job received from any one of the plurality of applications in a common manner, independently of the plurality of applications;

the plurality of applications are not configured to issue process execution requests to the engine, but only the common software platform is configured to issue process execution requests to the engine; and wherein the operating system executes the plurality of image processing applications and the common software platform in parallel.

26. The print control method according to claim 25, further comprising the step of:

if there is the possibility of said suspension, and if said multiple print jobs include one or more simplex print jobs, then adjusting a print order of said multiple print jobs by giving higher priority to the simplex print jobs.

27. A print control method for controlling multiple print jobs requested from a plurality of image processing applications in an imaging apparatus, comprising the steps of:

providing a common software platform that runs on an operating system of the imaging apparatus and is accessible from said plurality of image processing applications so as to be used in common among the applications;

receiving first image data of a first print job and second image data of a second print job from the plurality of image processing applications;

dividing each of said first and second image data into subdivisions and recombining the subdivisions into a series of transmission image information units that are to be reproduced on a plurality of recording mediums;

receiving an execution state notice for each subdivision, the execution state notice representing whether the associated subdivision is going to be executed;

determining whether there is a possibility that reproduction of one of the subdivisions will be suspended based on the execution state notice; and if there is not the possibility of said suspension, then reproducing at least a portion of the subdivisions of the second image data before all the subdivisions of the first image data are reproduced, wherein the common software platform is configured to receive operation mode information from each of the plurality of applications according to a unified rule and to issue process execution requests to an engine based on the received operation mode information and to directly control execution of a print job received from any one of the plurality of applications in a common manner, independently of the plurality of applications;

the plurality of applications are not configured to issue process execution requests to the engine, but only the common software platform is configured to issue process execution recluests to the engine; and wherein the operating system executes the plurality of image processing applications and the common software platform in parallel.

28. The print control method according to any one of claims 24 through 27, wherein it is determined that there is the possibility of said suspension when the recording medium is not supplied into the imaging apparatus, or when the recording medium is not ejected from the imaging apparatus.

29. The print control method according to any one of claims 24 through 27, wherein one or more said multiple print jobs are chargeable, and it is determined that there is the possibility of said suspension when fee payment is not made.

* * * * *